United States Patent
Zhang

[11] Patent Number: 5,454,630
[45] Date of Patent: Oct. 3, 1995

[54] AUTOMOTIVE ANTILOCK BRAKING

[75] Inventor: Zhihong Zhang, Novi, Mich.

[73] Assignee: General Motors Corporation, Detroit, Mich.

[21] Appl. No.: 235,733

[22] Filed: Apr. 29, 1994

[51] Int. Cl.$^6$ ............................................. B60T 8/60
[52] U.S. Cl. ............................... 303/175; 364/426.02
[58] Field of Search ..................... 303/100, 103, 303/105, 1, 22.1; 364/426.01, 426.02

[56] References Cited

U.S. PATENT DOCUMENTS

| | | | |
|---|---|---|---|
| 3,630,578 | 2/1971 | Kaiser | 303/1 X |
| 3,632,176 | 1/1972 | Gaeke | 303/100 |
| 3,909,071 | 9/1975 | Klaft | 303/100 X |
| 4,701,855 | 10/1987 | Fennel | 303/105 |
| 4,965,729 | 10/1990 | Hafner | 303/100 X |
| 5,150,299 | 9/1992 | Fujioka | 303/103 X |
| 5,222,570 | 6/1993 | Kawamura et al. | 180/197 |

OTHER PUBLICATIONS

905144 "Compound Control of Braking and Suspension Systems", H. C. Klein, pp. 199–211.
C382/047 "Influence of type and suspension dynamics on the braking performance of an anti–lock system on uneven roads", Jagt et al, pp. 453–460.
900205 "A New Algorithm for ABS to Compensate for Road–Disturbance", Watanabe et al, pp. 79–87.

*Primary Examiner*—Robert J. Oberleitner
*Assistant Examiner*—Lee W. Young
*Attorney, Agent, or Firm*—Michael J. Bridges

[57] ABSTRACT

A brake control system maximizes braking efficiency under uneven driving surface conditions by including a capability to detect change in normal force at the tire-driving surface interface and to include detected change in tire normal force in the detection of incipient wheel lockup conditions and in the determination of appropriate brake pressure command adjustments when such lockup conditions are detected.

4 Claims, 4 Drawing Sheets

AUTOMOTIVE ANTILOCK BRAKING

FIELD OF THE INVENTION

This invention relates to automotive vehicle antilock braking control and, more particularly, to a method for improving antilock braking control performance under uneven driving surface conditions.

BACKGROUND OF THE INVENTION

Slip and acceleration of the wheels of an automotive vehicle provide information on wheel lock-up conditions from which brake pressure commands for each of a plurality of brake pressure actuators may be generated in an automotive vehicle antilock braking system ABS. It is known to estimate wheel slip and acceleration using wheel speed information from the wheels of the vehicle. The estimated slip and acceleration may be applied to pressure command functions or as reference indices to predetermined look-up tables from which the brake pressure commands are retrieved.

The information provided by the estimated wheel slip and acceleration is limited to indicating whether wheel lockup conditions are present, and does not distinguish the source of the estimated wheel slip and acceleration leading to the indicated lock-up condition. Conventional antilock braking control systems treat a wheel lock-up condition as a low driving surface friction coefficient μ condition, as such systems don't have information on tire normal force Fz. For example, when a large decrease in tire normal force occurs, the corresponding wheel may lock up due to a lack of frictional force Fx, wherein frictional force Fx may be expressed as $$Fx = \mu * \lambda * Fz$$

where $\lambda$ is wheel slip. This can lead the conventional antilock system to interpret a presence of a low-μ driving surface, since it assumes a frictional force change is a result of a friction coefficient change. As a result of the interpreted presence of a low μ driving surface, the antilock brake control algorithm will command a brake pressure reduction to avoid lockup. This reduction may be unnecessary however, as the decrease in normal force is typically only transient in nature, and the wheel speed will thereafter recover on its own. Such unnecessary brake pressure reduction can result in false entry into antilock braking control and decreased braking performance.

Accordingly, what is needed is an antilock braking control approach that can better distinguish and react to the source of a change in tire frictional force, by including tire normal force information in the control of braking force so as to sustain braking performance under uneven driving surface conditions.

SUMMARY OF THE INVENTION

The present invention addresses the described need through an antilock braking system that detects the presence of, and accounts for changes in tire normal force and efficiently incorporates such information in the detection of wheel lockup conditions and the resulting activation, deactivation and control of antilock braking. More specifically, information on change in tire normal force at individual vehicle wheels is interpreted to estimate the degree it contributed to any corresponding change in tire frictional force. Diagnosis of and response to any incipient wheel lockup condition are provided that account for that degree of contribution.

In one aspect of this invention, the antilock braking activation and deactivation criteria of wheel acceleration and wheel slip are adjusted in the presence of significant change in tire normal force to time the activation and deactivation of the antilock braking control more precisely to detected incipient wheel lockup conditions and not to uneven driving surface conditions. In a further aspect of this invention, once antilock braking control is activated, the relationship between the wheel parameters of wheel acceleration and wheel slip and the brake pressure command may be adjusted as a function of change in tire normal force, to provide for antilock braking control responsive primarily to change in road surface friction coefficient.

In yet a further aspect of this invention, the adjusted criteria are provided in the form of a plurality of schedules or lookup tables of reference values one or more of which may become active in the antilock braking system control in response to the estimated change in tire normal force. The described varying criteria and the plurality of schedules may, in yet a further aspect of this invention, include a dedicated set thereof corresponding to each of the wheels of the vehicle. Activation decisions and brake pressure commands are referenced from the one or more active schedules. Computational intensity and control throughput burden are thereby relieved while preserving the improvement to braking performance under uneven driving surface conditions.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
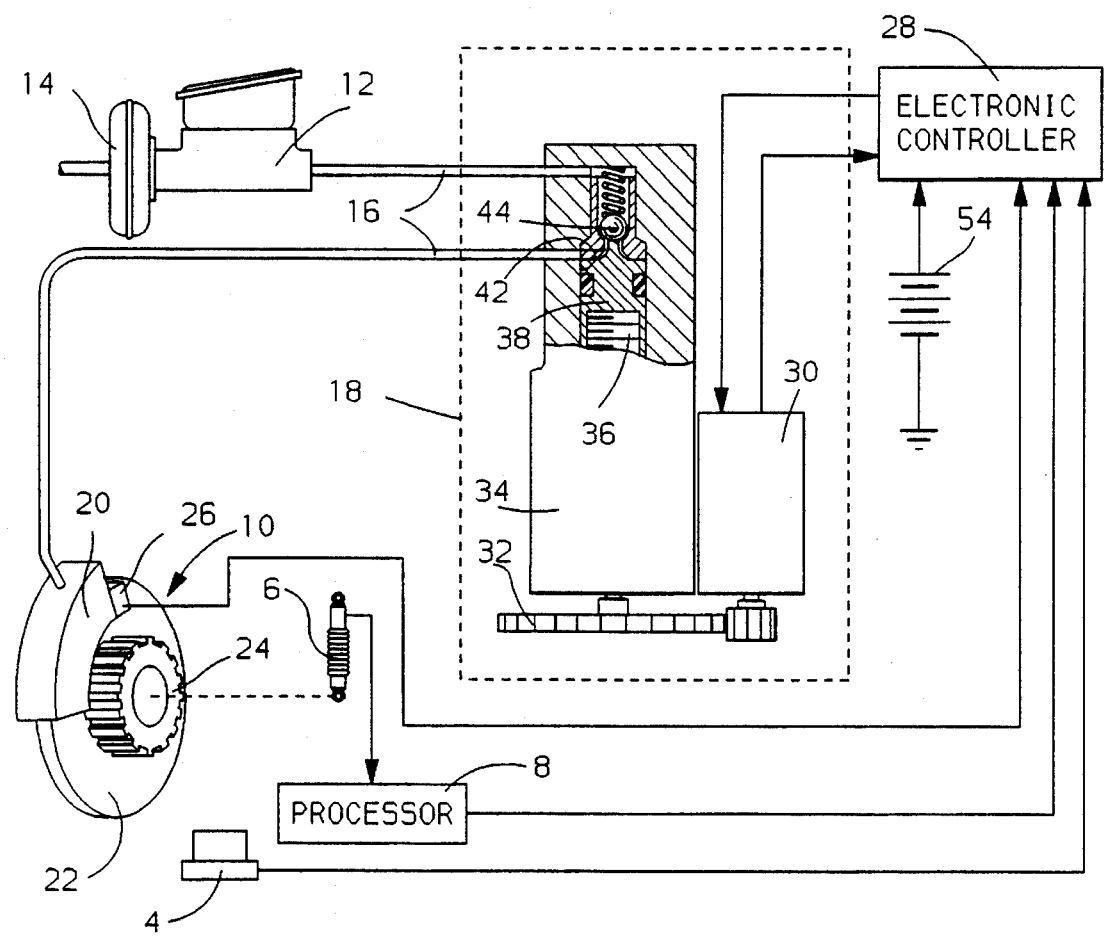
FIG. 1 is a general diagram of the antilock braking system hardware applied to an automotive vehicle in accord with the preferred embodiment of this invention.

A wheel lock control system for a wheel of a motor vehicle is illustrated in FIG. 1. In general, the wheel includes a brake unit 10 operated by a hydraulic pressure provided by a master cylinder 12 and a hydraulic boost unit 14 operated by the vehicle operator. The hydraulic fluid under pressure from the master cylinder 12 is provided to the brake unit 10 via brake line 16 and a pressure modulator 18. The brake unit 10 is illustrated as a disc brake system that includes a caliper 20 located at a rotor 22. The wheel includes a wheel sensing assembly comprised of an exciter ring 24 rotated with the wheel and an electromagnetic sensor 26 which monitors the rotation of the exciter ring to provide a signal having a frequency proportional to the speed of the wheel.

The wheel speed from the sensor 26 is provided to an electronic controller 28.

The pressure modulator 18 is controlled by the electronic controller 28 to limit the brake pressure applied to the wheel brake assembly 10 to prevent wheel lock-up. The modulator 18 is illustrated in an inactive position when it is transparent to the braking system. This is the modulator home position during normal vehicle braking. In general, when the controller 28 senses a braking condition whereat the wheel is approaching an incipient wheel lock-up, the pressure modulator 18 is controlled to regulate the braking pressure to the wheel to maintain the braking of the wheel in a stable braking region.

The pressure modulator includes a DC torque motor 30 having an output shaft which drives a geartrain 32 which, in turn, rotates a linear ball screw actuator 34. The ball screw actuator contains a linearly stationary ball screw which, when rotated, linearly positions a nut 36. The nut 36 terminates in a piston 38 such that as the linear ball screw rotates, the piston 38 is either extended or retracted depending on the direction of the rotation of the torque motor 30. The modulator 18 includes a housing in which a cylinder 42 is formed. The piston 38 is reciprocally received within the cylinder 42.

The cylinder 42 forms a portion of the fluid path between the master cylinder 12 and the wheel brake unit 10. Included within this fluid path is a normally closed ball check valve 44 which, when closed, isolates the master cylinder 12 from the wheel brake unit 10. The ball check valve 44 is operated to an open position by the piston 38 when it is positioned in an extended position within the cylinder 42 as illustrated in FIG. 1. This position is the home position of the modulator 18. When the ball check valve is opened, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator.

However, when the torque motor 30 is operated by the electronic controller 28 to modulate the braking pressure in the wheel brake unit 10, the piston 38 is retracted, allowing the ball check valve to seek and isolate the master cylinder 12 from the wheel brake unit 10 as long as the pressure in the cylinder 42 is less than the pressure from the master cylinder 12. Further retraction of the piston 38 functions to increase the volume in the cylinder 42 thereby decreasing the pressure applied to the wheel brake unit 10.

By controlling the DC torque motor 30, a pressure at the wheel brake can therefore by modulated to control values less than the master cylinder 12 pressure output until such time that the piston 38 again unseats the ball check valve 44 or until the pressure generated by the pressure modulator at the wheel brake unit 10 exceeds the fluid pressure output of the master cylinder 12. When this later condition exists, the ball check valve 44 is opened by the differential fluid pressure which limits the pressure of the wheel brake unit 10 at the master cylinder 12 pressure. In this manner, the wheel cylinder pressure can never exceed the operator established pressure.

Substantially at each corner of the vehicle a suspension position sensor 6 is connected between the vehicle body and unsprung masses to measure the relative vertical position of the vehicle body to the unsprung masses and to generate an output vertical suspension position signal for input to a processor 8 for conventional analog filtering thereof and for differentiation thereof. The differential of the vertical suspension position signal provides relative wheel vertical velocity information which is output by the processor 8 to the electronic controller 28. An LVDT position sensor is suitable for use as suspension position sensor 6 and such a sensor is available from, among others, Nartron Corporation of Reed City, Mich. An acceleration sensor 4 is likewise positioned at each corner of the vehicle, and generates an absolute body corner vertical acceleration signal of that corner of the vehicle for input to the electronic controller 28, which may prepare the signal for use in accord with this invention through conventional analog filtering of the signal. An absolute acceleration sensor suitable for use in this system is made by first Inertia Corporation of Hampshire, England. Acceleration sensor 4 should be mounted with care so as to minimize cross-axis sensitivity which might contaminate the vertical acceleration signal with horizontal acceleration information.

Figure 2:
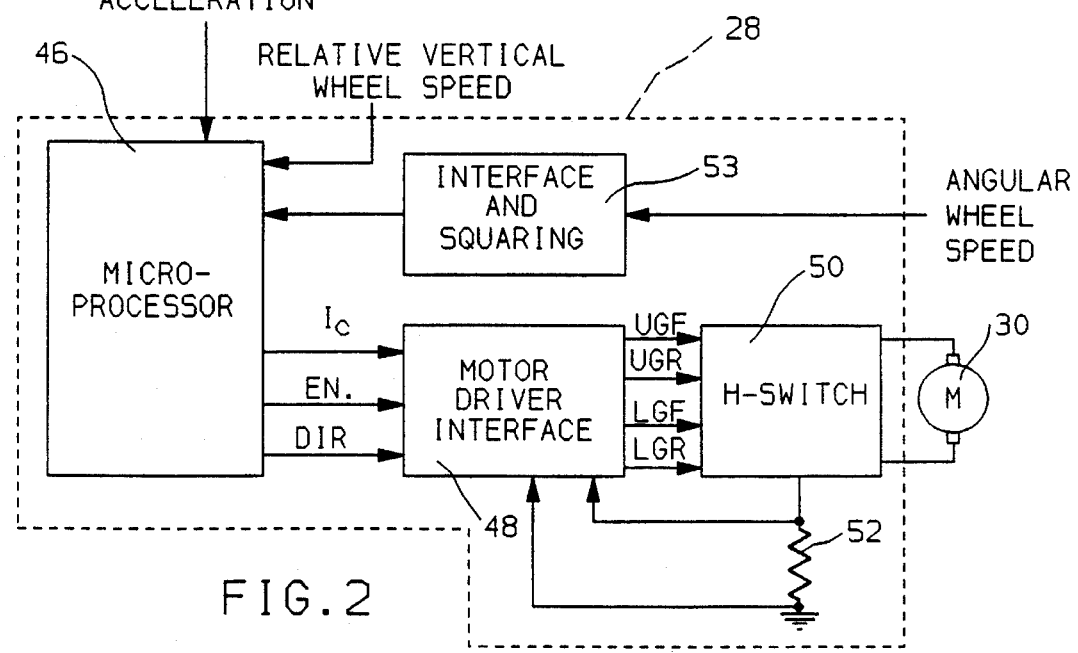
FIG. 2 is a general diagram of the electronic controller of FIG. 1 for controlling current to the motor of the motor driven pressure modulator of FIG. 1.

Referring to FIG. 2, the electronic controller 28 of FIG. 1 is illustrated and generally takes the form of digital computer-based controller. The controller includes a microprocessor 46 that is standard in form and includes the standard elements such as a central processing unit which executes an operation program permanently stored in conventional read only memory and which stores tables and constants used in controlling the modulator 18, an analog to digital converter, a random access memory and input/ output circuitry utilized to provide motor control signals to motor driver interface circuitry 48. The input/output circuit further includes input ports for receiving the wheel speed signal from the output of an interface and squaring circuit 53 having an input from the wheel speed sensor 26, and for receiving absolute body corner vertical acceleration and relative wheel vertical velocity signals.

The motor driver interface circuit 48 receives an enable signal EN, a motor current command signal $I_c$ and a forward/reverse direction signal DIR from the microprocessor 46 and controls an H-switch driver 50 to establish the command of motor current IC in the required forward or reverse direction. The current to the torque motor 30 is controlled to the command value via a closed-loop control configuration that responds to the actual motor current represented by the voltage across a sense resistor 52. In response to the direction DIR and motor current $I_c$ commands the motor driver interface 48 energizes the upper and lower forward gates via the upper gate signal UGF and lower gate signal LGF to control the DC torque motor 30 in the forward direction to apply torque pressure and to energize the upper and lower reverse gates via the signals UGF and LGF respectfully to control the DC torque motor 30 in a reverse direction to retract the piston 38 to reduce pressure at the wheel brake. The microprocessor 46 may take the form of a Motorola single chip microcomputer MC-68HC11. The motor driver interface 48 and H-switch 50 may take the form of the driver illustrated in U.S. Pat. No. 4,835,695 issued May 30, 1989.

During a typical antilock brake control cycle established by the antilock braking system ABS of FIGS. 1 and 2, when an incipient wheel lock condition is sensed, a release phase is indicated and the motor current is first stored as a measure of the brake pressure at the time the incipient wheel lock condition was first sensed, after which the motor current is controlled to quickly retract the piston 38 to release brake pressure to allow recovery from the incipient wheel lock condition. This reversal is accomplished by commanding a reverse motor direction and setting the command current $I_c$ at a maximum reverse current value. The motor driver interface 48 responds to these commands by energizing the upper and lower reverse H-switch gate switches to drive the motor 30 in the reverse direction at the commanded current level.

When recovery from the incipient wheel lock condition is sensed, an apply phase is indicated and the brake pressure is re-applied first to a significant fraction of the pressure existing at the time the incipient wheel lock condition was sensed and thereafter ramped. This is accomplished by commanding a forward motor direction and setting the command current at an initial value that is a significant fraction of the stored current when the incipient wheel lock condition was sensed and thereafter ramping the value of the commanded motor current. The motor driver interface 48 responds to these commands by energizing the upper and lower H-switch gate switches to drive the motor in a forward direction at the commanded level. The brake pressure is ramped until such time that an incipient wheel lockup condition is again sensed at which time the cycle is repeated.

The rate at which the brake pressure is ramped is a function of predetermined wheel parameters. In this embodiment, the brake pressure ramping is controlled as a predetermined function of wheel slip and wheel acceleration such that the pressure apply ramp rate becomes smaller as the wheel approaches an incipient wheel lockup condition represented by increasing wheel slip and wheel deceleration. In the preferred embodiment, the schedule of ramp rates as a function of the wheel parameters is provided by storing a plurality of brake apply modes in a lookup table as a function of the wheel parameter of acceleration and slip. The mode corresponding to the specific combination of values of wheel slip and wheel acceleration is retrieved from the lookup table and the current to the torque motor 30 controlled to establish the corresponding pressure ramp rate.

Conventional antilock braking control systems treat a wheel lock-up condition as a low-μ condition, in which μ is the coefficient of friction between the tire and the driving surface, as such systems don't have information on tire normal force. For example, when a large decrease in tire normal force occurs, the corresponding wheel tends to lock up rapidly due to a lack of frictional force Fx, wherein frictional force Fx may be expressed as $$Fx=\mu*\lambda*Fz$$

where λ is wheel slip, and Fz is tire normal force. This can lead the conventional antilock system to interpret a presence of a low-μ driving surface, since it assumes a frictional force change is a result of a friction coefficient change. As a result of the interpreted presence of a low μ driving surface, the antilock brake control algorithm may command a brake pressure reduction to avoid lock-up. This reduction is unnecessary however, as the decrease in normal force is typically only transient in nature, and the wheel speed will thereafter recover on its own. Such unnecessary brake pressure reduction may result in false entry into antilock braking control and decreased braking performance.

To avoid such unnecessary brake pressure reduction, the present invention estimates change in tire normal force and includes the estimated change in a determination of antilock braking commands. In one embodiment, change in tire normal force for each of the vehicle wheels is estimated and included along with wheel acceleration and wheel slip in a determination of antilock braking commands. In another embodiment within the scope of this invention, a varying one of a plurality of schedules between wheel parameters antilock braking commands are activated according to an estimate of change in tire normal force, so that at any time during vehicle braking, an appropriate schedule between the parameters and the commands may be applied according to the current estimated change in tire normal force. For example, in the present embodiment, the plurality of schedules includes two schedules, as illustrated in FIG. 5, to be described, representing two relationships between the wheel parameters of acceleration and slip and antilock braking commands. A first of the two schedules is active when change in tire normal force is estimated to be less than a predetermined threshold change, and the second schedule is activated elsewhere. The relationship between wheel parameters and antilock braking commands in the second schedule includes an adjustment for the impact of a relatively significant change in tire normal force on how antilock braking commands should respond to the wheel parameter information, as will be described.

Figure 3:
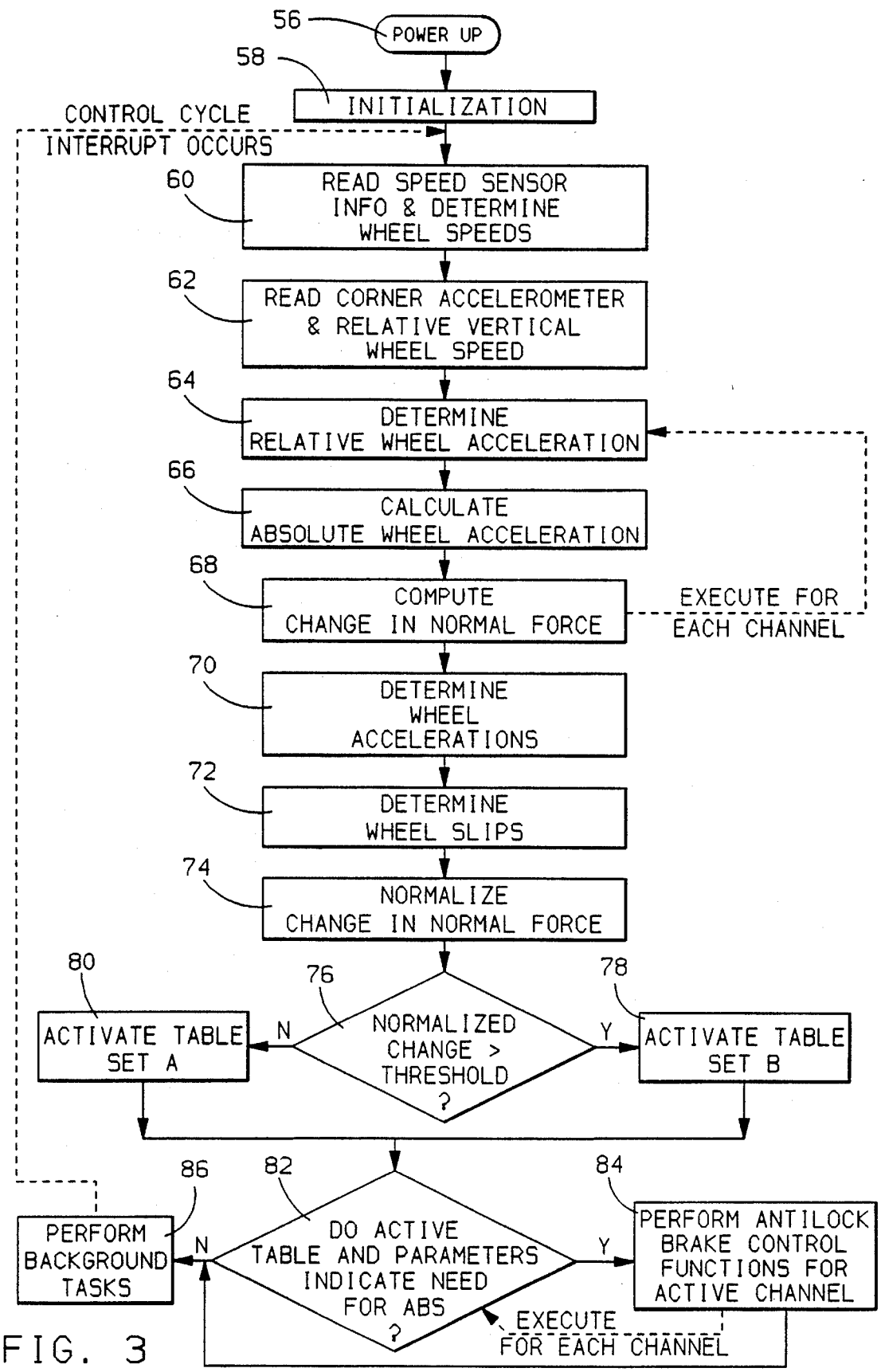
FIGS. 3 and 4 are computer flow diagrams illustrating steps executed by the electronic controller of FIG. 1 in carrying out the principles of this invention in accord with the preferred embodiment.
Figure 4:
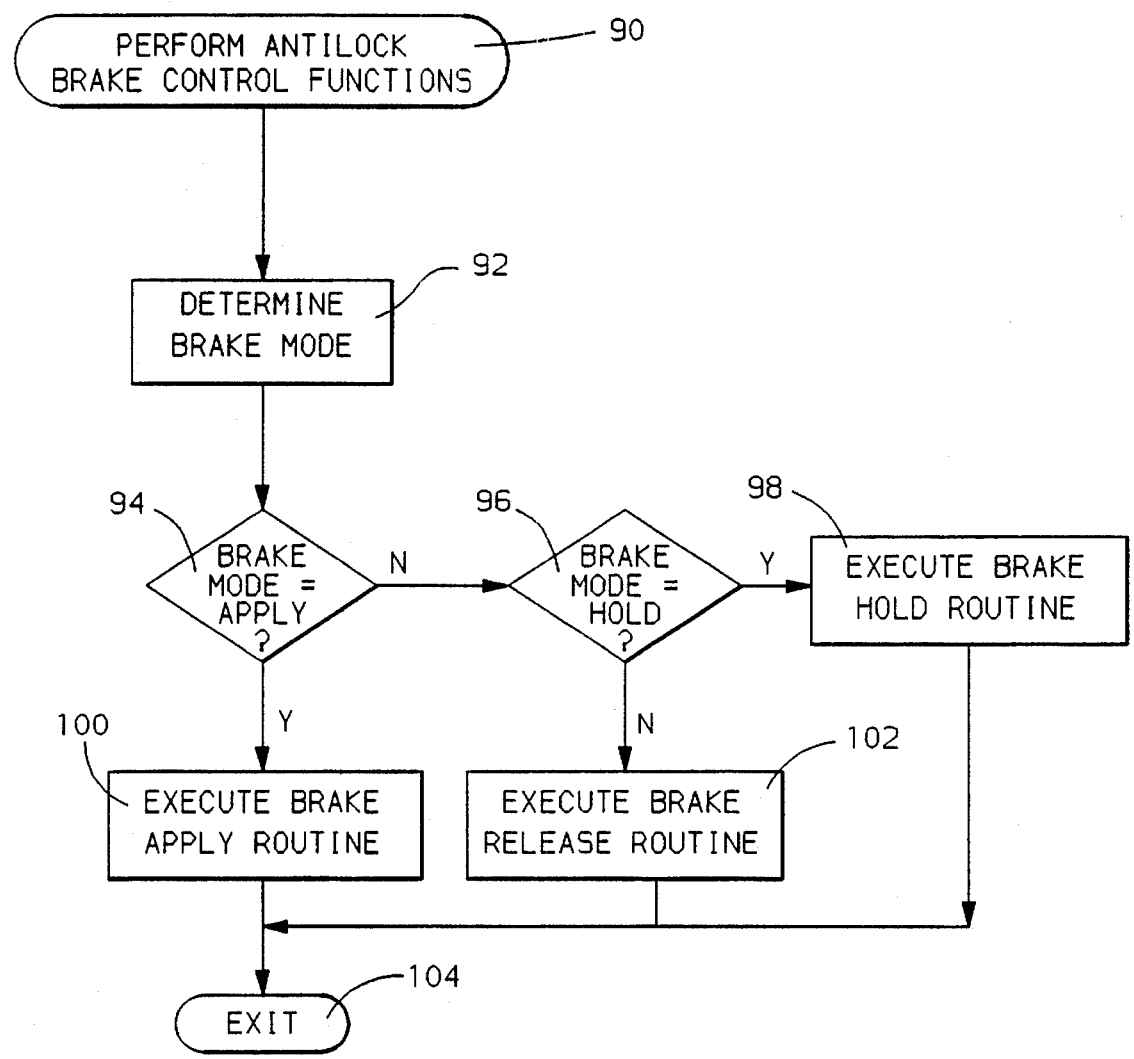

The operation of the electronic controller 28 in controlling the DC torque motor in accord with this invention is illustrated in FIGS. 3 and 4. The read only memory of the microprocessor 46 contains the instructions necessary to implement the algorithm as diagrammed in those figures. Referring first to the diagram of FIG. 3, when power is first applied to the system from a vehicle battery 54 (FIG. 1) such as when a conventional vehicle ignition switch, not illustrated, is rotated to its "on" position, the routine of FIG. 3 is initiated at the step 56 and proceeds to a step 58 to provide for system initialization. The initialization entails clearing registers, initializing various memory variables to calibrated values and other initialization functions generally known in the art. After the initialization is complete, the routine proceeds to perform antilock brake control functions as required in this embodiment. These antilock control functions are performed by executing a control cycle illustrated by steps 60–86 of FIG. 3 in response to each of repeated control cycle interrupts which are generated at predetermined fixed time intervals, such as 5 millisecond time intervals.

Upon occurrence of a control cycle interrupt, the microprocessor 46 (FIG. 1) begins executing the functions embodied in the control cycle. First, at step 60, wheel speed sensor information is read and wheel speed is computed for each of the wheels of the vehicle. The routine of FIG. 3 then proceeds to a step 62 to read relative wheel vertical velocity Vr(k) and absolute body corner vertical acceleration Aa(k) signals for each of the corners of the vehicle for the present (kth) iteration of this routine. Such information on absolute vertical acceleration Aa(k) is provided by accelerometer 4 (FIG. 1) and on relative vertical velocity Vr(k) is determined by processor 8 (FIG. 1), such as through a differentiation of the described filtered vertical suspension position signal. After reading Aa(k) and Vr(k) at the step 62 for each of the four corners of the vehicle, the routine executes the steps 64–68 for each antilock brake channel in this embodiment, such as for each wheel of the vehicle, to estimate change in tire normal force at each of the corners of the vehicle corresponding to each of the vehicle wheels.

Specifically, a relative wheel acceleration value Ar(k) for the present iteration of this routine as indicated by the index k is determined at a step 64 as follows $$Ar(k)=Ka*(Vr(k)-Vr(k-1))-(Kv+Ka*T-2)*Ar(k-1)-(1-Kv)*Ar(k-2)$$

which has been arrived at through discrete time vertical wheel dynamics modelling and application of the discrete Kalman filter scheme detailed by B. D. O. Anderson and J. B. Moore in "Optimal Filtering," Prentice Hall, 1979 to the model, and by algebraically manipulating a Z-transform of the Kalman filter estimate. The Kalman filter gains Kv and Ka may be obtained by solving a discrete-time Ricatti equation. In this embodiment, Kv and Ka are set to 0.72 and 24. The constant T is the control cycle time of 0.005 seconds in this embodiment. Vr(k−1) is the relative vertical velocity for the most recent prior control cycle for the wheel presently under analysis, and Ar(k−1) and Ar(k−2) are the relative wheel accelerations for the most recent and second most recent prior control cycles respectively, for the wheel presently under analysis.

After determining Ar(k) at the step 64, the routine moves to a step 66 to determine absolute wheel acceleration AWa(k) as the difference between the absolute corner acceleration Aa(k) and the relative wheel acceleration Ar(k). The routine then moves to step 68 to generate change in normal force ΔFz for the wheel through a high frequency dynamics analysis for a typical vehicle wheel assumed to be substantially in contact with the driving surface throughout the wheel motion, wherein the analysis results in the following representation of the change in normal force $$\Delta Fz = m1 * Aa(k) + m2 * AWa(k)$$

in which m1 is the sprung mass at the applicable corner of the vehicle, generally set to one quarter of the total vehicle mass and m2 is the unsprung mass at the applicable corner of the vehicle or the wheel mass. Typical values for m1 and m2 may be obtained through measurement of the mass of the vehicle and wheel used in the application. As described, Aa(k) is the absolute body corner vertical acceleration for the present (kth) control cycle and AWa(k) is the absolute wheel vertical acceleration for that control cycle.

After computing change in tire normal force ΔFz, the steps 64–68 are repeated for remaining vehicle wheels until a change in tire normal force for each of the wheels for the present control cycle is computed, after which the routine advances to a step 70 to determine individual wheel accelerations and to a step 72 to determine individual wheel slip values for the wheels of the vehicle. As is generally known in the art, wheel acceleration information may be provided through a differentiation of the determined wheel speed values and the wheel slip values may be determined as a difference between an estimated vehicle velocity and estimated individual wheel velocities. After the step 72, the routine proceeds to a step 74 to normalize the change in tire normal force for the antilock brake channels as computed at the repeated step 68, by dividing each of the changes by the normal force of the corresponding tire. Tire normal force may be computed as a sum of the change in tire normal force with the steady state tire normal force which may be predetermined as a function of an expected reactive normal force at each tire under steady state conditions. After normalizing the change in normal force for each of the channels at the step 74, the routine proceeds to a step 76 to compare the normalized changes in normal force to a threshold value, such as predetermined as twenty percent in this embodiment.

For each of a plurality of schedules between wheel parameters and antilock brake command information, a corresponding tire normal force change threshold value may be predetermined in accord with this invention to activate the corresponding schedule. For example, in the present embodiment, the plurality is set to two, wherein a single tire normal force change threshold defines which of the two schedules are active at any time. If any of the changes in tire normal force, as normalized, exceed the predetermined threshold at the step 72, then for the channel corresponding to that change in tire normal force, a second schedule is activated and the first schedule is deactivated, and otherwise a first schedule is activated and the second deactivated.

In alternative embodiments within the scope of this invention, the plurality may exceed two. In such embodiments, more than one threshold should be pre-calibrated to define which schedule should be selected from the plurality as active for any of the individual channels at any time. The active schedule should be the one having antilock braking information best suited to the present estimate of change in tire normal force. In yet a further embodiment within the scope of this invention, a single schedule may be provided having, as its reference parameters, a value representing change in tire normal force and conventional wheel parameters, such as acceleration and slip.

The entries in such a single schedule should be determined in a conventional calibration process as appropriate antilock braking command values corresponding to selected wheel parameter values and selected change in tire normal force. The determined values should be stored in the schedule in a manner allowing them to be referenced as a function of the wheel parameters and the change in tire normal force. For example, the determined values may be stored in a conventional table look-up format having as lookup parameters the wheel parameters and change in tire normal force, and having as output values antilock braking command information.

Returning to FIG. 3, if, for each of the antilock braking channels of this embodiment, the normalized change in tire normal force exceeds the threshold at the step 72, then a second schedule, called schedule B, is activated for that channel by moving to a step 78. Otherwise, schedule A is activated for that channel by moving to a step 80. The activation of either of schedule A or B for each channel may be provided by setting a flag in microprocessor random access memory to indicate which channel is active for each channel.

Figure 5A:
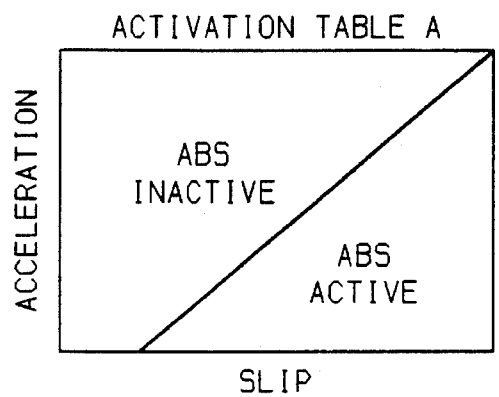
FIGS. 5a and 5b describe relationships between wheel parameters and antilock brake activation and pressure commands for a first change in normal force condition.

FIG. 5 illustrates representative schedules for both schedule A and for schedule B for the present embodiment. Each schedule includes an activation table for activating antilock braking and a command table for generating a brake pressure command once antilock braking has been activated. Specifically, FIG. 5a shows an activation table of table set A (schedule A) wherein the reference parameters of wheel acceleration and slip are used to determine whether an incipient wheel lockup condition is present such that antilock braking should be activated or whether normal braking should have full authority. Antilock braking should be activated when the relationship between the lookup parameters of acceleration and slip fall at a point below the diagonal line, and should be deactivated elsewhere allowing normal braking to have full braking authority.

Figure 6A:
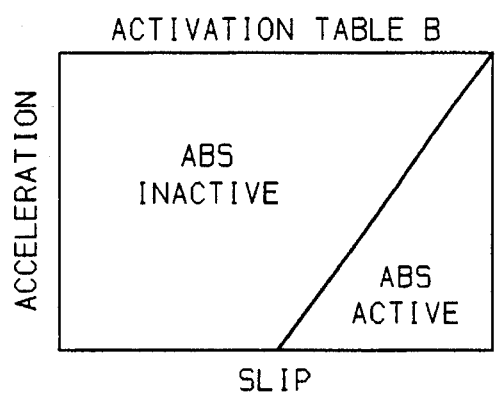
FIGS. 6a and 6b describe relationships between wheel parameters and antilock brake activation and pressure commands for a second change in normal force condition.

The relationship between the wheel parameters and the activation of antilock braking may be predetermined through a conventional calibration process as to the conditions of wheel acceleration and slip that do or do not indicate an incipient wheel lockup condition for the wheel, as is well-understood in the antilock brake art. The activation table from table set B (schedule B) is illustrated in FIG. 6a and includes adjustments from the activation table A (FIG. 5a) to accommodate an assumed presence of a significant change in tire normal force ΔFz which served to activate schedule B, as described. As can be seen from FIG. 6a, antilock braking will be activated more restrictively under the significant ΔFz than for that of schedule A, indicating that an incipient wheel lockup condition will less likely be present for a given sensed wheel slip and acceleration in a presence of a significant ΔFz. This is a result of the capability of the wheel to recover on its own from the condition once the transient change in tire normal force is relieved, as the driving surface coefficient μ may not have decreased and thus may not have caused the change in the wheel parameters, as described. The degree of restrictiveness should be determined in accord with the magnitude of ΔFz and the degree it tends to provide misleading information on the value of the driving surface coefficient.

Figure 5B:
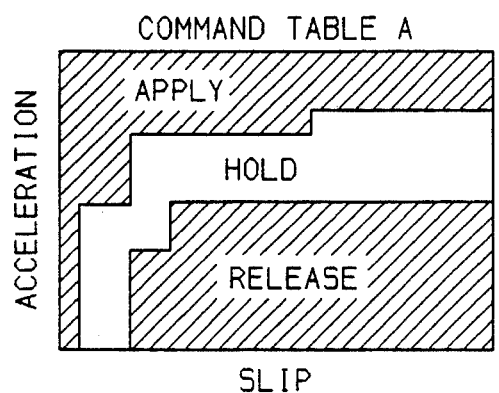
Figure 6B:
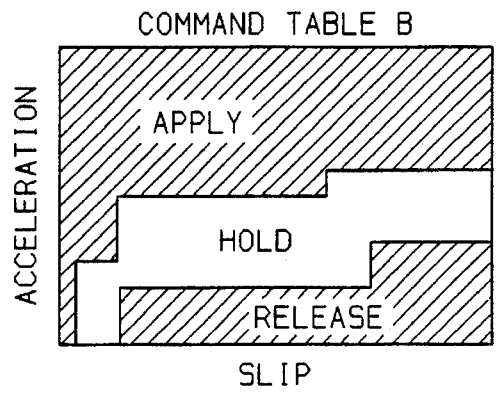

Once antilock braking has been activated, FIG. 5b and FIG. 6b describe how antilock braking pressure commands are referenced in response to wheel slip and acceleration. FIG. 5b is a brake command table for the table set A (schedule A) which, as described, is activated when ΔFz is relatively small, such as when driving over relatively smooth driving surfaces, and FIG. 6b is a brake command table for table set B (schedule B) which is activated when ΔFz is relatively large, such as when driving over substantially uneven driving surfaces.

The brake pressure command entries in the tables of FIGS. 5b and 6b should be determined through conventional calibration process in accord with a desired system braking performance. The command entries in FIG. 5b may be calibrated while passing over the relatively smooth driving surfaces and the entries on FIG. 6b should be calibrated while passing over appropriately uneven driving surfaces. The brake pressure command entries in the table of FIG. 6b compensate for the impact of significant change in tire normal force on desired brake pressure, reducing antilock braking control sensitivity to such significant changes.

In an alternative embodiment in accord with this invention, the relationships shown in FIGS. 5 and 6 may be expanded to include schedules C, D, etc., such as in corresponding FIGS. 7, 8, etc., one of which may be activated when a normalized change in tire normal force exceeds appropriate threshold values. As more such schedules are calibrated and included in an embodiment within the scope of this invention, the resolution of the compensation for change in tire normal force is improved, wherein the activation and command pressure of the antilock braking more closely responds to true change in road coefficient and is less sensitive to change in tire normal force. Additional calibration and processing time will result from the addition of more of such schedules, and the throughput capacity of the application should be analyzed in determining an appropriate tradeoff between control precision and calibration and processing time.

In yet a further embodiment of this invention, these activation and brake pressure command schedules may be simplified in number by having a single activation schedule and a single brake pressure command schedule, as described, including as reference parameters wheel acceleration and slip and a value representing change in tire normal force. In the described embodiments, the schedules may be implemented in the form of conventional lookup tables, as described. Alternatively, the schedules may be implemented in the form of functions describing the relationship between the wheel parameters, the tire normal force parameter, and the antilock braking information.

Returning to FIG. 3, after activating either of schedule A or B at the appropriate step 78 or 80, the routine proceeds to a step 82 to reference for each channel, from the activation table corresponding to the activated schedule, an antilock braking activation decision corresponding to the wheel parameters of acceleration and slip. If the wheel parameters reference an "active" command from the active one of the activation table A or B as determined at the step 82, which would indicate a presence of an incipient wheel lockup condition, the routine moves to a step 84 to perform antilock brake control functions for the corresponding channel determined to be active. The antilock brake control functions are illustrated in FIG. 4, to be described. After performing the antilock brake control functions at the step 84, the routine moves to step 86.

Alternatively, if the wheel parameters applied to the active table indicate that an incipient wheel lockup condition is not present such that antilock braking should not be active for the channel as determined at the step 82, normal vehicle braking is provided for by avoiding execution of the routine of FIG. 4 and proceeding directly from the step 82 to the step 86, at which background tasks are carried out as may be necessary in the present embodiment to be executed with the routine of FIG. 3. Such background tasks may include diagnostic tasks for the antilock brake control system of this embodiment or may include system maintenance tasks as are generally understood in the art.

The foregoing steps 60–86 are repeated for each control cycle in the present embodiment. Thus, when a control cycle interrupt occurs, such as issued by electronic controller 28 (FIG. 1) on a timed basis, a new cycle begins starting at the step 60 and the functions represented by the steps 60–86 are repeated as described. Repeated executions of steps 82 and 84 with antilock brake control as required establishes the general brake cycle wherein when wheel slip and acceleration conditions represent an incipient wheel lockup condition, a pressure release phase is indicated and brake pressure is released to allow the wheel to recover from the incipient wheel lock condition, and when wheel acceleration and slip conditions represent that the wheel is approaching wheel lock recovery, but has not substantially recovered, a pressure hold phase is indicated and brake pressure is held substantially constant at a value calculated to represent the amount of pressure remaining at the wheel brake. This calculated hold value is based on the measured optimal pressure and the measured release duration that allows the wheel to continue to re-accelerate toward recovery while preventing unnecessary pressure relief. Further details on the hold pressure determination and application may be found in U.S. Pat. No. 4,917,445 issued Apr. 17, 1990, assigned to the assignee of this invention.

When wheel acceleration and slip conditions represent a recovered condition from the lockup condition, an apply phase is indicated and wheel pressure is re-applied and ramped until another incipient wheel lockup condition is sensed at which time the release phases indicated in the cycle is repeated. Such execution of the steps 82 and 84 is carried out for each antilock braking channel in this embodiment, such as for each of the front wheels of the vehicle and for the rear wheels together, in a three channel configuration, as described. In an alternative embodiment in which antilock braking at each of the four vehicle wheels is controlled independently, this execution of the steps 82 and 84 is provided for four channels. Still further, the steps 82 and 84 may be executed once or twice per control cycle in respective one and two channel antilock brake control configurations within the scope of this invention.

Referring to FIG. 4, there is illustrated a general flow diagram of the antilock brake control functions executed once for each braking channel determined to be active at the step 82 of FIG. 3, as described, where each channel includes a modulator 18. In the embodiment of this invention in which the four wheels of the vehicle are controlled independently, this requires the routine of FIG. 4 to be executed four times for each active channel, for each of the control cycles described in FIG. 3. In another embodiment the rear brakes may be controlled by a single modulator such that the routine of FIG. 4 would then be executed once for each active front wheel and once for the combined rear wheels for each control cycle in which antilock brake control is active for the rear wheels, as a rear wheel incipient wheel lockup condition is determined to be present, as determined at the step 82 of FIG. 3. The inventors intend that a variety of brake configurations fall within the scope of this invention and for each modulator corresponding to an active channel in the alternative embodiments the routine of FIG. 4 should be executed once for each control cycle as described in FIG. 3.

The antilock brake control routine of FIG. 4 is entered at a step 90 when called by the step 84 of FIG. 3, and proceeds to a step 92 that selects the required brake mode. In general, the brake mode selection is made at the step 92 from a number of apply modes, a hold mode, and a number of release modes. Each of the number of apply modes has a related rate of increase in brake pressure as a function of wheel acceleration and wheel slip, and each of the number of release modes has a related rate of decrease in brake pressure as a function of wheel acceleration and wheel slip. The apply modes provide for progressively lower rates of increase in brake pressure with increasing values of wheel deceleration and increasing values of wheel slip which are representative of the wheel approaching critical slip. The release modes are based on conditions on wheel slip and acceleration representing an incipient wheel lock condition and provide for a control of the release pressure in response to the incipient wheel lock condition. For example, each release mode has associated therewith a calibrated period of rapid pressure release to provide a calibrated pressure reduction. The hold mode provides that brake pressure is to be held substantially constant at a value calculated to represent the amount of pressure remaining at the wheel brake. This calculated hold value is based on the measured optimal pressure and the measured release duration that allows the wheel to continue to re-accelerate toward recovery while preventing unnecessary pressure relief, as described.

After determining the appropriate brake mode as a function of wheel acceleration and slip applied to the active command table selected from the tables as generally illustrated in the FIGS. 5b and 6b as activated at the step 78 or 80 of FIG. 3, the routine of FIG. 4 proceeds to a step 94 to determine if the determined brake mode is an apply mode. If the brake mode referenced from the active table is not apply, the routine proceeds to a step 96 to determine if the brake mode is "hold". If the brake mode is hold at step 96, the routine proceeds to a step 98 to execute a brake hold routine, wherein brake pressure is held substantially constant at a value representing the amount of pressure remaining at the wheel brake. As described, the constant pressure is determined in response to a measured optimal pressure and the measure release duration, to allow the wheel to accelerate toward recovery without providing unnecessary brake pressure relief. The further details of the brake hold routine executed at the step 98 may be found in U.S. Pat. No. 4,917,445 issued Apr. 17, 1990, assigned to the assignee of this invention. After executing such brake hold routine at the step 98, the routine proceeds to a step 104 to exit and return to the described routine of FIG. 3.

Returning to the step 96, if brake mode is not hold, the routine proceeds to a step 102 to execute a brake release routine to release pressure as an incipient lock position has been detected from the wheel parameters of acceleration and slip applied to the activated command table. In general, the brake release routine provides for control of the torque motor 30 to release brake pressure to allow wheel recovery from the incipient wheel lock condition. When an incipient wheel lock condition is first indicated by the step 92 first indicating a brake release mode, the step 102 stores the commanded motor current as representing the motor current at the time the incipient wheel lock condition was detected. This stored current value represents a measure of the brake pressure producing the maximum brake effort that corresponds to the wheel critical slip. Thereafter, in this repeated execution of step 102 for the respective braking channel, the brake pressure is released in accord with the release mode determined at the step 92. Repeated execution of the brake release routine 102 results in the wheel recovering from the incipient wheel lock condition. This recovery condition is detected at the step 92 when the mode retrieved from the activated lookup table corresponding to the wheel slip and acceleration values is one of the pressure hold modes as described.

When the wheel recovers, as indicated by the step 92 determining a brake apply mode, the routine proceeds from the step 94 to a step 100 to execute a brake apply routine. In the brake apply routine, the apply current is first set to a significant fraction of the current stored in step 102 when the incipient wheel lock condition was first detected. Thereafter, upon repeated executions of the step 100, the apply current is ramped at a controlled rate to increase the brake pressure at the wheel brake until an incipient wheel lock condition is again sensed at the step 92 when a release mode is determined via the active command table in response to the wheel acceleration and slip values.

As the wheel brake pressure is ramped via repeated executions of the step 100, the ramp rate may vary as the parameters of slip and acceleration and tire normal force vary in accord with this invention. Variations in the parameters of acceleration and slip will, in this embodiment, vary the brake pressure command by referencing a different entry in a command table, and significant variations in tire normal force may lead to activation of a new command table from a plurality of command tables referenced by a value representative of change in tire normal force, as described. In an alternative embodiment of this invention, the parameters used to reference a single command table may include wheel acceleration, wheel slip and tire normal force, such that a single table will be active at all times when antilock braking is enabled, and changes in any of the three lookup parameters will result in a varying lookup value which may change the apply mode ramp rate. Such principles apply likewise to brake hold and release modes, in which substitution of tables or changing of a value referenced from a table will result in variation of the determined hold and release pressures.

In the foregoing manner, the diagnosis of a decrease in the friction coefficient of a driving surface is made less sensitive to change in tire normal force by detecting when such change in tire normal force is present and then incorporating the detected change into the diagnosis. Antilock brake control may thus be made responsive to lockup conditions resulting from a decrease in the friction coefficient and not to a mere transient change in tire normal force. The present invention, by providing detailed information on the condition of the driving surface as reflected in change in tire normal force, and by making such information available for a determination of antilock brake control commands, provides for improved braking performance.

The preferred embodiment for the purpose of explaining this invention is not to be taking as limiting or restricting the invention since many modifications may be made through the exercise of skill in the art without departing from the scope of this invention.

The embodiments of the invention in which a preferred property or privilege is claimed are described as follows:

1. A method of controlling brake pressure applied to a brake of a vehicle wheel coupled to a vehicle tire substantially at a vehicle corner, the vehicle tire passing over a driving surface, comprising the steps of:

estimating change in normal force at a vehicle tire-driving surface interface, by (a) estimating vertical acceleration of the vehicle wheel, (b) estimating vehicle body vertical corner acceleration substantially at the vehicle corner, and (c) forming a weighted sum of the estimated vertical acceleration and the estimated vehicle body vertical corner acceleration as an estimate of change in tire normal force;

estimating values of predetermined wheel parameters;

sensing an incipient wheel lockup condition; and controlling brake pressure in response to the sensed incipient wheel lockup condition so as to allow wheel recovery from the sensed incipient wheel lockup condition, by (a) determining a pressure release command as a predetermined function of the estimated change in normal force and of the estimated values, and (b) releasing brake pressure at the wheel brake in accord with the pressure release command.

2. A system for controlling brake pressure applied to a brake of a vehicle wheel coupled to a vehicle tire passing over a driving surface, comprising the steps of:

estimating change in tire normal force;

generating values of predetermined wheel parameters;

sensing an incipient wheel lockup condition;

providing a plurality of stored schedules of brake pressure commands, wherein brake pressure commands are stored in each of the plurality of schedules as a function of the predetermined wheel parameters;

designating as active a one of the plurality of stored schedules as a predetermined function of the estimated change in tire normal force;

determining a brake pressure command from the one of the plurality designated as active; and controlling brake pressure in accord with the determined brake pressure command to allow recovery from the incipient wheel lockup condition.

3. The method of claim 2, wherein the step of sensing an incipient wheel lockup condition further comprises the steps of:

providing a plurality of stored activation schedules wherein activation decisions are stored in each of the plurality of stored activation schedules as a function of the predetermined wheel parameters;

designating as active a one of the plurality of stored activation schedules as a function of the estimated change in tire normal force;

referencing an activation decision as a function of the generated values from the schedule designated as active; and sensing an incipient wheel lockup condition in accord with the referenced activation decision.

4. The method of claim 2, wherein the predetermined wheel parameters include wheel acceleration and wheel slip.

* * * * *